(12) United States Patent
Park

(10) Patent No.: US 10,124,524 B2
(45) Date of Patent: Nov. 13, 2018

(54) METHOD FOR MANUFACTURING THERMOPLASTIC POLYURETHANE THREAD

(71) Applicant: Heedae Park, Busan (KR)

(72) Inventor: Heedae Park, Busan (KR)

( * ) Notice: Subject to any disclaimer, the term of this patent is extended or adjusted under 35 U.S.C. 154(b) by 68 days.

(21) Appl. No.: 14/697,887

(22) Filed: Apr. 28, 2015

(65) Prior Publication Data

US 2015/0224697 A1    Aug. 13, 2015

Related U.S. Application Data

(63) Continuation of application No. PCT/KR2013/010312, filed on Nov. 14, 2013.

(30) Foreign Application Priority Data

Dec. 26, 2012    (KR) .................. 10-2012-0153869

(51) Int. Cl.
| | |
|---|---|
| *D01D 5/32* | (2006.01) |
| *B29C 47/06* | (2006.01) |
| *D03D 15/00* | (2006.01) |
| *D01F 1/10* | (2006.01) |
| *D01F 6/70* | (2006.01) |
| *D01F 8/16* | (2006.01) |
| *B29C 47/00* | (2006.01) |
| *B29C 47/88* | (2006.01) |

(Continued)

(52) U.S. Cl.
CPC ........ *B29C 47/065* (2013.01); *B29C 47/0014* (2013.01); *B29C 47/8895* (2013.01); *D01F 1/10* (2013.01); *D01F 6/70* (2013.01); *D01F 8/16* (2013.01); *D03D 15/0027* (2013.01); *B29C 47/0898* (2013.01); *B29C 47/8815* (2013.01); *B29K 2075/00* (2013.01); *B29K 2101/12* (2013.01); *B29K 2105/0005* (2013.01)

(58) Field of Classification Search
CPC ..... B29B 9/00; B29B 2009/165; B29B 13/02; B29B 13/06; B29B 13/065; D01D 5/08; D01D 5/28; D01D 5/30; D01D 5/34; D01D 5/36; D01F 1/02; D01F 1/10; D01F 8/10; D01F 8/16
USPC ............ 264/172.12, 172.13, 172.15, 172.17, 264/172.18, 211
See application file for complete search history.

(56) References Cited

U.S. PATENT DOCUMENTS

| | | | |
|---|---|---|---|
| 2002/0084550 A1* | 7/2002 | Roberts | .............. A46B 3/16 264/172.15 |
| 2004/0092696 A1* | 5/2004 | Vedula | .............. C08G 18/3215 528/44 |

(Continued)

*Primary Examiner* — Leo B Tentoni
(74) *Attorney, Agent, or Firm* — Park & Associates IP Law, P.C.

(57) ABSTRACT

The present invention relates to a composition and a method for manufacturing a thermoplastic polyurethane thread of particularly 250 denier or less with enhanced physical properties by collecting virgin type thermoplastic polyurethane resin or polyurethane scraps remaining after using the thermoplastic polyurethane resin for airbag patterns or after processing the thermoplastic polyurethane resin, mixing various additives and the different types of thermoplastic polyurethane together, compounding the resulting mixture and then coextruding the resulting thermoplastic polyurethane compound with an extruder into a thermoplastic polyurethane thread.

3 Claims, 5 Drawing Sheets

(51) Int. Cl.
*B29K 75/00* (2006.01)
*B29K 101/12* (2006.01)
*B29K 105/00* (2006.01)
*B29C 47/08* (2006.01)

(56) References Cited

U.S. PATENT DOCUMENTS

2006/0121812 A1* 6/2006 Suzuki ................ D04H 1/4358
442/411
2014/0101825 A1* 4/2014 Vedula .................... D01D 5/08
2/243.1

* cited by examiner

METHOD FOR MANUFACTURING THERMOPLASTIC POLYURETHANE THREAD

REFERENCE TO RELATED APPLICATIONS

This is a continuation of pending International Patent Application PCT/KR2013/010312 filed on Nov. 14, 2013, which designates the United States and claims priority of Korean Patent Application No. 10-2012-0153869 filed on Dec. 26, 2012, the entire contents of which are incorporated herein by reference.

FIELD OF THE INVENTION

The present invention relates to a method for manufacturing a thermoplastic polyurethane thread having a single-layered or multi-layered structure using an extruder and, more particularly, to a method for manufacturing a thermoplastic polyurethane thread that includes mixing a thermoplastic polyurethane resin and various additives together, compounding the resulting mixture and then coextruding the compound with an extruder to fabricate a thermoplastic polyurethane thread with excellent wear resistance, mechanical properties, durability, thermo-formability, adhesive properties, etc.

BACKGROUND OF THE INVENTION

As well known, the threads used to weave industrial fabrics or footwear fabrics are generally polyester, nylon, acrylic resins, or the like.

The fabrics made of these threads are not only poor in durability and wear resistance but also problematic in the adhesive properties and thus have many limitations on their functional use such as for footwear fabrics or the like.

In addition, the development of softer fabrics has been on consistent demand in order to improve the tactility of fabrics in human body regions, so many attempts have been made to solve the problem by using thermoplastic polyurethane resins.

In the fabrication of threads using thermoplastic polyurethane, however, the spinning methods such as for manufacturing polyester or nylon threads have a high processing cost and the inherent characteristics of thermoplastic polyurethane such as viscosity, tackiness, etc. bring about many difficulties in the manufacture of thermoplastic polyurethane threads.

A conventional solution to this problem involves coating the surface of polyester, nylon or acrylic threads with PVC or PP or manufacturing a thermoplastic polyurethane thread of at least 1,000 denier as shown in the cited patent document 3.

However, the coated threads (more specifically, coated polyester, nylon or acrylic threads) are poor not only in the durability and wear resistance but also in the properties including mechanical/chemical strengths, etc.

Further, all the cited patent documents 1, 2 and 3 have a problem that the threads have high stiffness due to the thread fineness of 1,000 denier or greater and thus are not suitable for use in footwear fabrics.

In addition, the cited patent document 5 involves low viscosity in the use of thermoplastic polyurethane, which eventually deteriorates the productivity, makes it impossible to make thin coated threads and creates the glossy surface of coated threads, thereby causing a demand for a separate process for providing a flattening (deglossing) effect.

SUMMARY OF THE INVENTION

For solving the problem with the prior arts, it is an object of the present invention to provide a method for manufacturing a single-layered or multi-layered thermoplastic polyurethane thread that includes mixing a polyurethane resin and various additives together, compounding the resulting mixture and then coextruding the resulting compound with an extruder.

It is another object of the present invention to provide a method for manufacturing a thermoplastic polyurethane thread with excellences in the durability, wear resistance, mechanical strengths, and chemical strengths.

It is further another object of the present invention to provide a method for manufacturing a thermoplastic polyurethane thread of 250 denier or less.

To achieve the objects of the present invention, there is provided a method for manufacturing a single-layered or multi-layered thermoplastic polyurethane thread that includes compounding thermoplastic polyurethane, a thickening agent and a lubricating agent with an extruder to prepare a thermoplastic polyurethane compound, optionally adding a color-based master batch, and then coextruding the thermoplastic polyurethane compound with a general extruder.

In the present invention, the thickening agent used in the preparation of the thermoplastic polyurethane compound may be any one selected from silica or inorganic substances, such as talc, calcium carbonate ($CaCO_3$), etc.

DETAILED DESCRIPTION OF THE INVENTION

Figure 1:
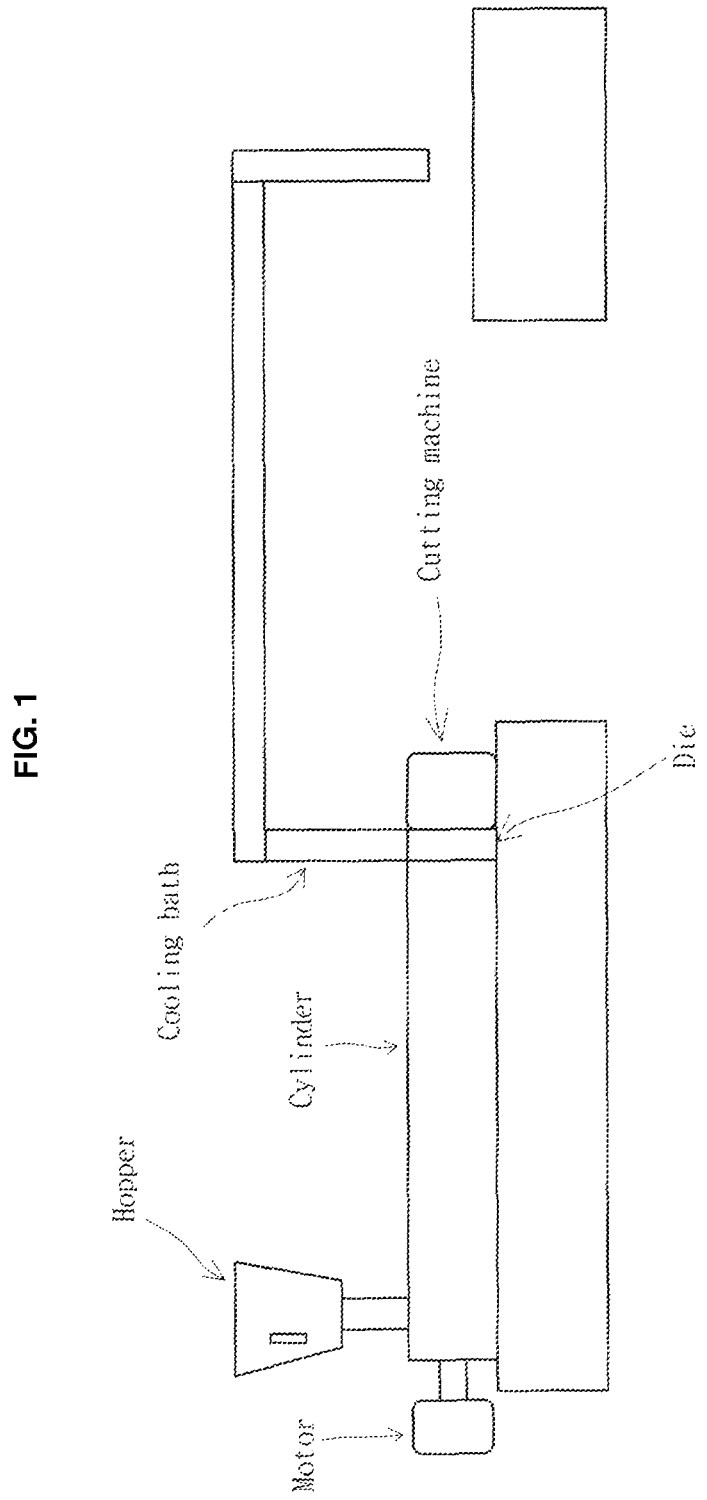
FIG. 1 is a diagram showing a process of mixing a thermoplastic polyurethane resin and various additives together and compounding the mixture with an extruder to prepare a thermoplastic polyurethane compound in accordance with one preferred embodiment of the present invention.

The present invention is directed to a method for manufacturing a multi-layered thermoplastic polyurethane thread that includes mixing thermoplastic polyurethane, a thickening agent and a lubricating agent together, melting and kneading the mixture and drying and aging the resulting mixture to prepare a thermoplastic polyurethane compound and then adding the compound into an extruder and, simultaneously, adding any one resin selected from the group consisting of thermoplastic polyurethane, polyester, nylon, and acrylic resins into another extruder, to form a thermoplastic polyurethane thread of which the inner part is made of the one resin selected from the group consisting of thermoplastic polyurethane, polyester, nylon, and acrylic resins and the outer part is made of the thermoplastic polyurethane compound.

Hereinafter, the embodiments of the present invention will be described with reference to the accompanying drawings as follows. There will be given, in the after-mentioned detailed description, representative examples of the present invention in order to achieve the technical objects of the present invention. Other examples available in the present invention will be replaced by the description in terms of the construction of the present invention.

The present invention is to embody a method for manufacturing a thermoplastic polyurethane thread of particularly 250 denier or less with enhanced physical properties by collecting a virgin type thermoplastic polyurethane resin or polyurethane scraps remaining after using the thermoplastic polyurethane resin for airbag patterns or after processing the thermoplastic polyurethane resin, mixing various additives and the different types of thermoplastic polyurethane resins together, compounding the resulting mixture and then coextruding the resulting thermoplastic polyurethane compound with an extruder to form a thermoplastic polyurethane thread.

Preferably, the present invention provides a method for manufacturing a thermoplastic polyurethane thread (hereinafter, referred to as "TPU thread") having a single-layered or multi-layered structure using a co-extruder to enhance the productivity and processability.

Particularly, the multi-layered TPU thread is manufactured such that a resin of high hardness grade, such as high-strength TPU, polyester, nylon, or acrylic resin is coextruded to form the inner part of the multi-layered TPU thread, while a resin of low hardness grade is coextruded to form the outer part of the multi-layered TPU thread at the same time. Unlike the conventional methods that involve coating the thread, this method involving co-extrusion of resins can enhance the tactile feel and the properties of the resulting TPU thread.

In this regard, the present invention also provides a method of manufacturing TPU threads in different colors by adding color-based master batches or in different hardness grades according to the content of the ingredients.

In this manner, the present invention is to realize a method of manufacturing a TPU thread of particularly 250 denier or less, with good inherent properties of TPU, more specifically, in terms of durability, wear resistance, mechanical strengths, and chemical strengths, thereby making the TPU thread widely applicable to sports goods, household products, industrial products, footwear fabrics, etc.

Hereinafter, the present invention will be described in further detail with reference to the preferred examples of the present invention, which are not given to limit the scopes of the present invention.

In the following examples, a detailed description will be given as to a method of manufacturing a single-layered TPU thread, a method of manufacturing a multi-layered TPU thread and the compositions used to manufacture the single-layered or multi-layered TPU thread.

Examples

1. Process of Preparing a TPU Compound Used to Manufacture a TPU Thread and its Composition A method for preparing a thermoplastic polyurethane compound (hereinafter, referred to as "TPU compound") according to the present invention is as illustrated in FIG. 1.

The method for preparing a TPU compound according to the present invention includes: (1) mixing thermoplastic polyurethane and various additives (preferably, a thickening agent and a lubricating agent) together and adding the mixture into a hopper of a general compounding extruder; (2) melting and kneading the thermoplastic polyurethane and various additives at a temperature of 150 to 250° C. under the pressure of 50 to 150 kgf in a cylinder of the compounding extruder to prepare a thermoplastic polyurethane compound; (3) cutting the thermoplastic polyurethane compound discharged from the die of the compounding extruder into thermoplastic polyurethane pellets in the cooling water; and (4) drying the thermoplastic polyurethane pellets at 60 to 80° C. for 4 to 6 hours and then aging at 30 to 50° C. for at least 7 days.

The ingredients of the composition used to prepare the TPU compound, more specifically, thermoplastic polyurethane, a thickening agent and a lubricating agent can be described as follows.

The thermoplastic polyurethane refers to a virgin type thermoplastic polyurethane prepared by polymerizing polyester polyol, polyether polyol, polycarprolactone, etc. together with aromatic isocyanate or aliphatic isocyanate using short-chain glycol (e.g., 1,4-butanediol) as a chain extender.

On the other hand, the present invention may use thermoplastic polyurethane scraps remaining after the production of footwear in place of the virgin type thermoplastic polyurethane. More specifically, the present invention may use airbag scraps or clear or semi-clear type thermoplastic polyurethane scraps collected after the processing of footwear airbags.

The present invention may further use a thickening agent in order to improve the productivity and flattening (deglossing) property. The thickening agent may include silica powder or inorganic substances (e.g., talc, $CaCO_3$, etc.) to make the compound thicker. The thickening agent may also include an alloy with a resin that is capable of providing compatibility with thermoplastic polyurethane, such as styrene butadiene styrene (SBS) block copolymer, styrene ethylene/butylene styrene (SEBS) resin, polyacetal resin (POM), styrene acrylonitrile (SAN) resin, etc.

The present invention may further use a lubricating agent in order to improve the productivity in the manufacture of TPU threads. More specifically, the lubricating agent may be montane wax, fatty acid (C=5-9) esters with pentaerythritol, etc. In this regard, the montane wax serves to improve the slipperiness between the co-extruder and TPU and thus prepare TPU threads having a constant thickness. The fatty acid ester enhances the fluidity of the TPU to increase the rate of extrusion.

The present invention may also use an additive for providing adhesion after weaving the TPU thread into a mesh fabric. The additive is a coupling agent (containing 2 to 20% of anhydrous maleic acid) based on olefin (e.g., PE, PP, EVA, etc.).

Figure 3:
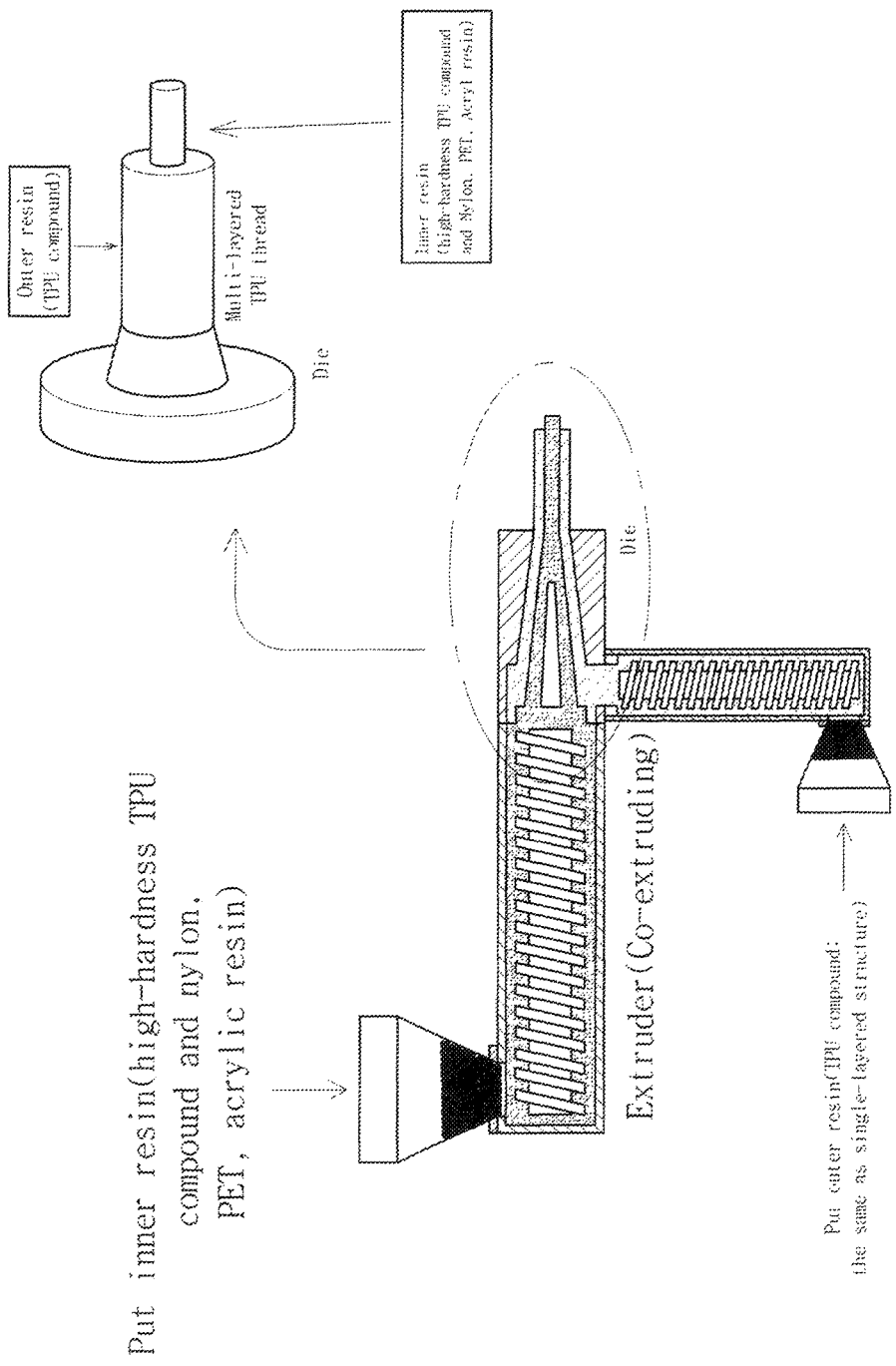
FIG. 3 is a diagram showing a method for manufacturing a multi-layered thermoplastic polyurethane thread using the thermoplastic polyurethane compound according to another preferred embodiment of the present invention and the structure of the thermoplastic polyurethane thread.

The TPU compound prepared by using the above-mentioned composition and preparation method is used to manufacture a TPU thread having a single-layered structure. The TPU compound may also be used to form an outer resin in the manufacture of a multi-layered TPU thread. More specifically, the TPU compound is passed through the die of a co-extruder as illustrated in FIG. 3 to form an outer resin.

In the manufacture of the single-layered TPU thread, a low-hardness TPU, more specifically, having a hardness of Shore 91±2 A is used. In the manufacture of the multi-layered TPU thread, the TPU constituting the outer resin is a high-hardness TPU having a hardness of Shore 65D and a tensile strength of at least 300 kgf/cm². The inner resin of the multi-layered TPU thread is a high-hardness resin capable of extrusion into threads, such as of nylon, polyester, acrylic resin, etc. other than the high-hardness TPU. This can be easily understood in the detailed descriptions of FIGS. 2 and 3 as follows.

Table 1 shows the results of using silica as a thickening agent in the manufacture of a TPU thread according to the present invention.

TABLE 1

| TPU compound (product name) | | AK-92A-4 | AK-92A-5 |
|---|---|---|---|
| Melting index (g/10 min) | | 13.50 | 8.45 |
| Flow point (° C.) | | 154.6 | 156.5 |
| Flow viscosity | 165° C. | 34,380 | 40,570 |
| (Pa · s) | 170° C. | 12,030 | 14,930 |
| Extrusion workability | | Good | Good |
| Silica content | | 1.5 phr | 3.0 phr |

As can be seen from Table 1, an increase in the silica content leads to the lower melting index and the higher fluid viscosity, which implicitly demonstrates that the compounds are made thicker. Further, an extrusion workability assessment shows that the workability is good when the silica content is 1.5 phr or greater. The product having a silica content of 3.0 phr is good in the workability but undesirably encounters extrusion blooming.

Additionally, the products called "AK-92A-4" or "AK-92A-5" as presented in Table 1 are TPU compounds for TPU thread that are prepared using the compositions and the preparation methods of the present invention, preferably, the TPU compounds prepared using silica as a thickening agent.

Table 1 presents the individual ingredients and the compositions used in the manufacture of the TPU compounds (more specifically, "AK-92A-4" and "AK-92A-5" as presented in Table 1).

TABLE 2

| Novel composition | AK-92A-4 (wt. %) | AK-92A-5 (wt. %) |
|---|---|---|
| Footwear airbag scrap | 50.0 | 50.0 |
| Virgin type TPU | 43.0 | 41.5 |
| Coupling of polyethylene base | 5.0 | 5.0 |
| Silica (thickening agent) | 1.5 | 3.0 |
| Montane wax | 0.2 | 0.2 |
| Fatty acid ester | 0.3 | 0.3 |

Table 3 shows the results of using an inorganic substance (e.g., talc) as a thickening agent in the manufacture of a TPU thread according to the present invention.

TABLE 3

| TPU compound (product name) | | TC-92A-3 | TC-92A-6 |
|---|---|---|---|
| Melting index (g/10 min) | | 9.50 | 5.65 |
| Flow point (° C.) | | 157.8 | 158.5 |
| Flow viscosity | 165° C. | 43,380 | 60,550 |
| (Pa · s) | 170° C. | 15,030 | 18,880 |
| Extrusion workability | | Good | Good |
| Talc content | | 10 phr | 20 phr |

As can be seen from Table 3, an increase in the talc content leads to the lower melting index and the higher fluid viscosity, which implicitly demonstrates that the compounds are made thicker. Further, an extrusion workability assessment shows that the workability is good when the talc content is 10 phr or greater. The product having a talc content of 30 phr is good in the extrusion workability but undesirably encounters extrusion blooming.

Additionally, the products called "TC-92A-3" or "TC-92A-6" as presented in Table 3 are TPU compounds for TPU thread that are prepared using the compositions and the preparation methods of the present invention, preferably, the TPU compounds prepared using an inorganic substance such as talc as a thickening agent.

Table 4 presents the individual ingredients and the compositions used in the manufacture of the TPU compounds (more specifically, "TC-92A-3" and "TC-92A-6" as presented in Table 3).

TABLE 4

| Novel composition | TC-92A-3 (wt. %) | TC-92A-6 (wt. %) |
|---|---|---|
| Footwear airbag scrap | 40.0 | 40.0 |
| Virgin type TPU | 44.5 | 34.5 |
| Coupling of polyethylene base | 5.0 | 5.0 |
| Talc (thickening agent) | 10.0 | 20.0 |
| Montane wax | 0.2 | 0.2 |
| Fatty acid ester | 0.3 | 0.3 |

Table 5 shows the results of using a polyacetal resin (POM) as a thickening agent in the manufacture of a TPU thread according to the present invention.

TABLE 5

| TPU compound (product name) | | PA-95A-3 | PA-95A-5 |
|---|---|---|---|
| Melting index (g/10 min) | | 10.20 | 6.65 |
| Flow point (° C.) | | 178.2 | 185.1 |
| Flow viscosity | 165° C. | 52,240 | 63,580 |
| (Pa · s) | 170° C. | 27,830 | 37,880 |
| Extrusion workability | | Good | Good |
| POM content | | 10 phr | 20 phr |

As can be seen from Table 5, an increase in the POM content leads to the lower melting index and the higher fluid viscosity, which implicitly demonstrates that the compounds are made thicker. Further, an extrusion workability assessment shows that the workability is good when the POM content is 10 phr or greater. The product having a POM content of 20 phr is good in the extrusion workability but undesirably becomes stiffer due to its higher hardness.

Additionally, the products called "PA-92A-3" or "PA-92A-5" as presented in Table 5 are TPU compounds for TPU thread that are prepared using the compositions and the preparation methods of the present invention, preferably, the TPU compounds prepared using a polyacetal resin (POM) as a thickening agent.

Table 6 presents the individual ingredients and the compositions used in the manufacture of the TPU compounds (more specifically, "PA-92A-3" and "PA-92A-5" as presented in Table 5).

TABLE 6

| Novel composition | PA-95A-3 (wt. %) | PA-95A-5 (wt. %) |
|---|---|---|
| Virgin type TPU | 84.5 | 74.5 |
| POM resin | 10.0 | 20.0 |
| Coupling of polyethylene base | 5.0 | 5.0 |
| Montane wax | 0.2 | 0.2 |
| Fatty acid ester | 0.3 | 0.3 |

A comparison of the results using the individual thickening agents shows that the use of silica can result in the best product (TPU thread) excellent in the productivity and flattening (deglossing) property.

2. Step of Preparing a Single-Layered TPU Thread

Figure 2:
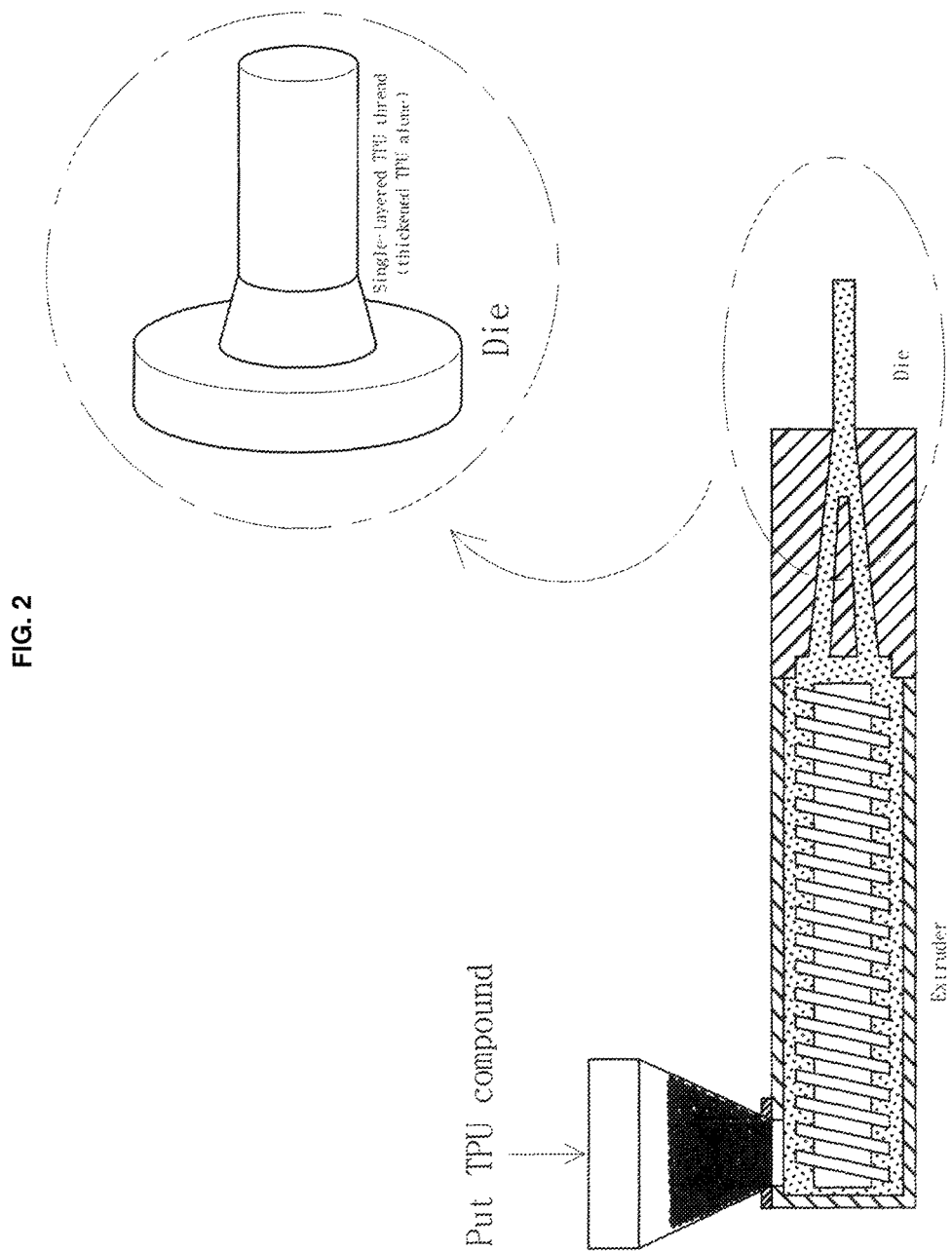
FIG. 2 is a diagram showing a method for manufacturing a single-layered thermoplastic polyurethane thread using the thermoplastic polyurethane compound according to one preferred embodiment of the present invention and the structure of the thermoplastic polyurethane thread.

The method for manufacturing a single-layered TPU thread using the TPU compound prepared by using the above-described composition and preparation method is as illustrated in FIG. 2.

Referring to FIG. 2, the TPU compound prepared by the afore-mentioned preparation method and a color-based master batch are mixed together and added into the hopper of an extruder (preferably, co-extruder). The TPU compound and the color-based master batch are mixed together and melted down at a temperature of 150 to 250° C. under the pressure of 50 to 150 kgf in the cylinder of the co-extruder.

Subsequently, the melted mixture of the co-extruder (i.e., the mixture of the TPU compound and the color-based master batch) is fed into the die and extruded at a temperature of 50 to 250° C. under the pressure of 50 to 150 kgf through the die to form a single-layered TPU thread according to the present invention.

3. Step of Preparing a Multi-Layered TPU Thread

The method for manufacturing a multi-layered TPU thread using the TPU compound prepared by using the above-described composition and preparation method and a high-hardness TPU, polyester, nylon, or acrylic resins is as illustrated in FIG. 3.

Referring to FIG. 3, the TPU compound prepared by the afore-mentioned preparation method is added into the hopper of a co-extruder. At the same time, a high-hardness TPU having a hardness of Shore 65D or greater and a tensile strength of 300 kgf/cm$^3$ or greater and a color-based master batch are added into the hopper of another co-extruder. In this regard, any one resin selected from nylon, polyester, or acrylic resin may be used in place of the high-hardness TPU and added together with the color-based master batch into the hopper of the co-extruder.

Subsequently, the low-hardness TPU compound added into the co-extruder is melted down at a temperature of 200 to 280° C. under the pressure of 50 to 150 kgf in the one co-extruder and fed into the die. At the same time, the high-hardness TPU and the master batch are melted down at a temperature of 150 to 250° C. under the pressure of 50 to 150 kgf in the other co-extruder and fed into the die. In this regard, the die is connected to the two co-extruders, as illustrated in FIG. 3.

The mixture of the low-hardness TPU compound, the high-hardness TPU and the master batch as fed into the die is simultaneously extruded under the pressure of 50 to 150 kgf to prepare a multi-layered TPU thread of which the inner part of the multi-layered structure is preferably formed from the high-hardness TPU and the outer part is formed from the low-hardness TPU. While the mixture is passing through the die, the inner part of the multi-layered TPU thread is maintained at a temperature of 200 to 280° C. and the outer part is maintained at 150 to 250° C.

4. Step of Cooling Down the Single-Layered or Multi-Layered TPU Thread

As illustrated in FIGS. 2 and 3, the single-layered or multi-layered TPU thread becomes cooler while passing through the die of the co-extruder. More specifically, the TPU thread is cooled down through a vertical cooling apparatus of FIG. 4 or a horizontal cooling apparatus of FIG. 5.

Figure 4:
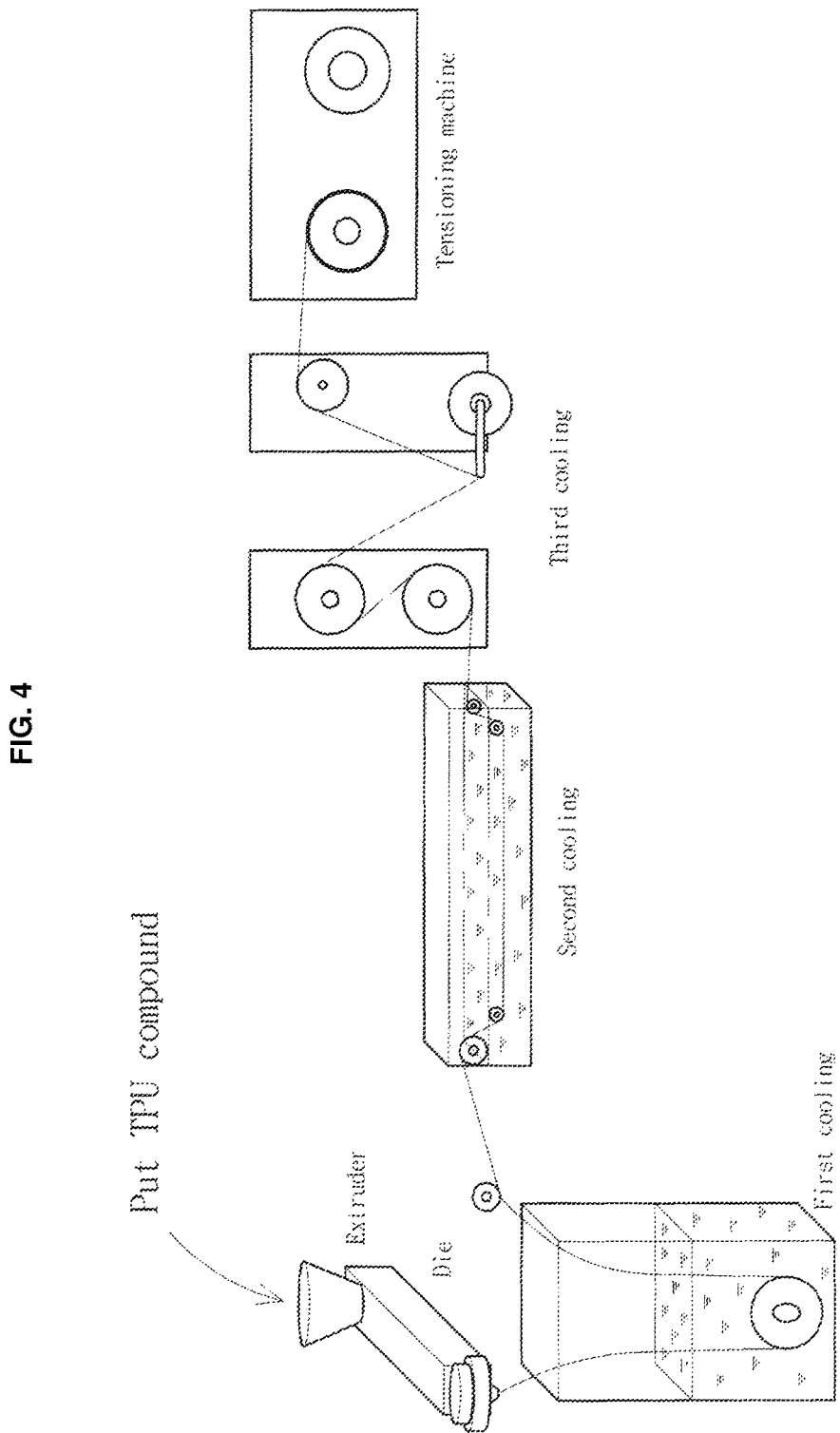
FIG. 4 is a diagram showing a cooling process for the single-layered or multi-layered thermoplastic polyurethane thread prepared by the method of FIG. 2 or 3 using a vertical cooling apparatus and then winding the resulting thermoplastic polyurethane thread.
Figure 5:
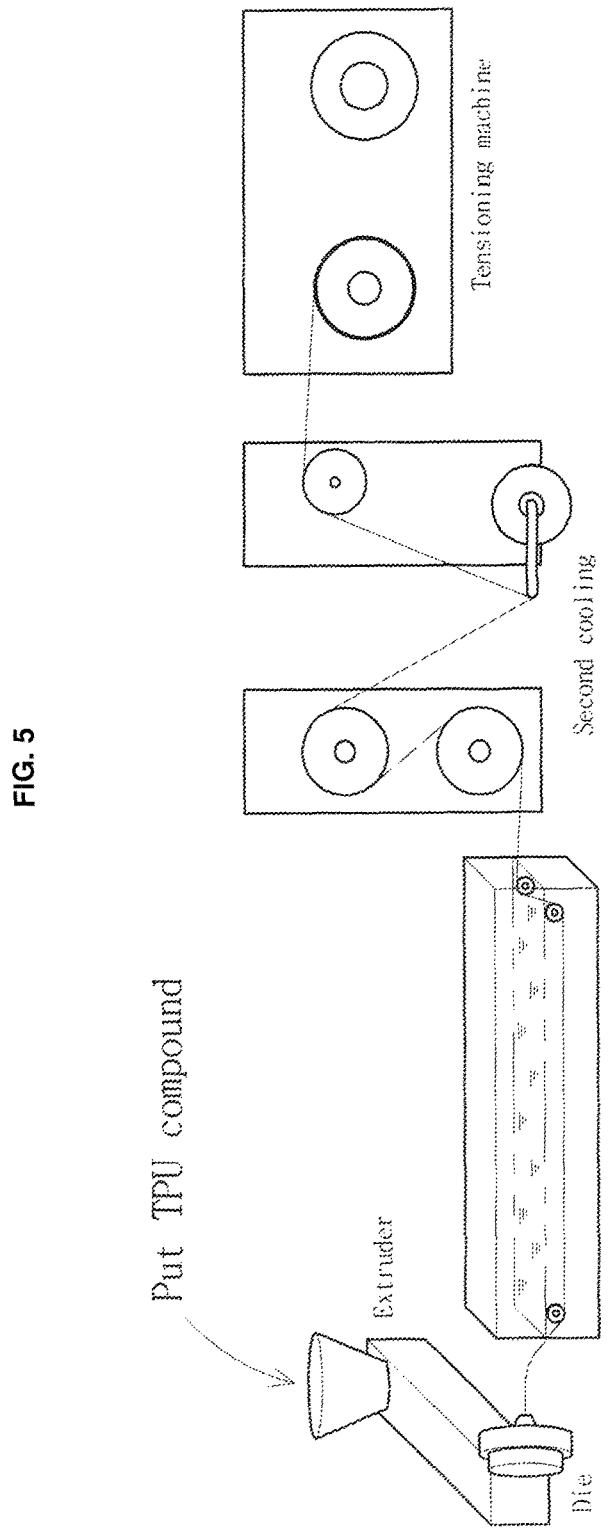
FIG. 5 is a diagram showing a cooling process for the single-layered or multi-layered thermoplastic polyurethane thread prepared by the method of FIG. 2 or 3 using a horizontal cooling apparatus and then winding the resulting thermoplastic polyurethane thread.

As illustrated in FIG. 4, the TPU thread passing through the die of the co-extruder (preferably, the single-layered or multi-layered TPU thread) is subjected to first and second cooling steps in a water bath filled with a cooling water. More specifically, the TPU thread is cooled down at a temperature of 10 to 15° C. in the first and second cooling steps, air-cooled at the room temperature in the third cooling step and then wound up by a general winding machine.

In this manner, the TPU thread extruded from the co-extruder is dropped into the water bath to cool off in the water bath in the first and second cooling steps and then air-cooled at the room temperature in the third cooling step. This can eliminate any problem with the tensioning process. In this regard, the temperature of the cooling water bath and the tensioning rate can be adjusted according to the type of the TPU resin.

As illustrated in FIG. 4, the TPU thread may also be cooled down using a horizontal cooling apparatus. More specifically, the TPU thread extruded from the co-extruder is cooled down in a first cooling step at a temperature of 10 to 15° C. in the cooling water bath, air-cooled at the room temperature in a third cooling step and then wound up by a general winding machine. In this regard, the cooling water bath is positioned close to the die of the co-extruder as possible. As described above, the temperature of the cooling water bath and the tensioning rate can also be adjusted according to the type of the TPU resin in this case.

The present invention mixes thermoplastic polyurethane and a thickening agent (preferably, silica or an inorganic substance such as talc, calcium carbonate, etc.) in the manufacture of a thermoplastic polyurethane thread, thereby advantageously achieving a good tactile feel and elasticity relative to the conventional polyester or nylon threads. In addition, as the multi-layered thermoplastic polyurethane thread is manufactured such that the inner part is made of high-hardness TPU, nylon, polyester or acrylic resins, while the outer part is made of low-hardness TPU, thereby achieving excellences in both strength and tactile feel.

Relative to the conventional fabrics (i.e., fabrics made of polyester, nylon or acrylic threads), the present invention can also advantageously have good wear resistance with enhanced mechanical properties such as tensile strength, etc. and durability and realize excellences in waterproofing property, formability and adhesiveness.

What is claimed is:

1. A method of producing a fabric with a thermoplastic polyurethane thread, the method comprising:
   providing a thermoplastic polyurethane thread, wherein said providing the thermoplastic polyurethane thread comprises:
      mixing thermoplastic polyurethane, a thickening agent and a lubricating agent, melting and feeding the resulting mixture, then drying and aging the mixture to prepare a thermoplastic polyurethane compound;

providing a co-extruder having a first feeder portion and a second feeder portion, the second feeder portion coupled to the first feeder portion of the co-extruder in angular arrangement to each other;

adding the thermoplastic polyurethane compound into the first feeder portion of the co-extruder; and simultaneously adding one resin selected from the group consisting of thermoplastic polyurethane, polyester, nylon, and acrylic resin into the second feeder portion of the co-extruder, said resin added to the second feeder portion having a hardness higher than the thermoplastic polyurethane compound added to the first feeder portion, and thereby, producing a multi-layered thermoplastic polyurethane thread having an inner part of higher hardness formed from said resin selected from the group consisting of thermoplastic polyurethane, polyester, nylon, and acrylic resin, and an outer part of lower hardness formed from the thermoplastic polyurethane compound, wherein the resultant thermoplastic polyurethane thread has a fineness of 250 denier or less; and producing a fabric with the thermoplastic polyurethane thread provided.

2. The method according to claim 1, wherein the thickening agent is selected from silica, an inorganic material, and an alloy with a resin selected from the group consisting of styrene butadiene styrene (SBS) block copolymer, styrene ethylene/butylene styrene (SEBS) resin, polyacetal resin (POM), and styrene acrylonitrile (SAN) resin.

3. The method according to claim 1, wherein the lubricating agent is selected from montane wax and fatty acid ester with pentaerythritol.

* * * * *